(12) United States Patent
Allison

(10) Patent No.: US 9,958,343 B2
(45) Date of Patent: May 1, 2018

(54) ERROR REDUCTION IN RADIATION-BASED TEMPERATURE MEASUREMENT SYSTEMS

(71) Applicant: Brain Temp, Inc., Englewood, CO (US)

(72) Inventor: Robert C. Allison, Rancho Palos Verdes, CA (US)

(73) Assignee: BRAIN TEMP, INC., Englewood, CO (US)

( * ) Notice: Subject to any disclaimer, the term of this patent is extended or adjusted under 35 U.S.C. 154(b) by 185 days.

(21) Appl. No.: 15/179,995

(22) Filed: Jun. 11, 2016

(65) Prior Publication Data
US 2016/0282197 A1      Sep. 29, 2016

Related U.S. Application Data

(63) Continuation of application No. PCT/US2014/069840, filed on Dec. 11, 2014.
(Continued)

(51) Int. Cl.
*G01K 1/16* (2006.01)
*G01K 1/20* (2006.01)
(Continued)

(52) U.S. Cl.
CPC .......... *G01K 11/006* (2013.01); *G01K 13/002* (2013.01)

(58) Field of Classification Search
CPC .... G01K 1/16; G01K 1/20; G01J 5/00; A61B 5/00
(Continued)

(56) References Cited

U.S. PATENT DOCUMENTS

| 3,657,644 A | 4/1972 | Beam et al. |
| 5,741,071 A | 4/1998 | Weiss et al. |

(Continued)

FOREIGN PATENT DOCUMENTS

| FR | 2497947 | 7/1982 |
| JP | S59192925 | 11/1984 |

(Continued)

OTHER PUBLICATIONS

Supplementary European Search Report & Written Opinion for related EP Application 14870324.2, dated Jul. 17, 2017, 6 pages.
(Continued)

*Primary Examiner* — Gail Kaplan Verbitsky
(74) *Attorney, Agent, or Firm* — Wiggin and Dana LLP; Joseph Casino; Andrew D. Bochner

(57) ABSTRACT

Apparatuses and systems for determining a temperature of a targeted subject are disclosed. A temperature sensing system may include an antenna for sensing electromagnetic radiation (e.g., microwaves, etc.) emanating from the source. Based on that electromagnetic radiation, the antenna generates a temperature signal. A switch, which is located at or adjacent to an output of the antenna, receives the temperature signal, as well as a reference signal from a termination. The temperature signal and the reference signal are conveyed along a cable to a signal converter. Signal-altering events that affect the temperature signal as it is conveyed also affect the reference signal. Thus, any error caused by a signal-altering event automatically cancels out. The signal converter measures or otherwise processes the temperature signal and, since there is no need to correct for errors in the temperature signal, the reference signal, and accurately calculates the temperature of the source.

13 Claims, 3 Drawing Sheets

Related U.S. Application Data

(60) Provisional application No. 61/915,867, filed on Dec. 13, 2013.

(51) Int. Cl.
*A61B 5/00* (2006.01)
*G01J 5/00* (2006.01)
*G01K 11/00* (2006.01)
*G01K 13/00* (2006.01)

(58) Field of Classification Search
USPC .................................... 340/870.17; 600/549
See application file for complete search history.

(56) References Cited

U.S. PATENT DOCUMENTS

| | | | |
|---|---|---|---|
| 6,834,991 B2 | 12/2004 | Roeder | |
| 7,197,356 B2 * | 3/2007 | Carr | A61B 5/01 374/122 |
| 8,062,228 B2 | 11/2011 | Carr | |
| 8,574,166 B2 | 11/2013 | Carr | |
| 8,934,953 B2 | 1/2015 | Carr et al. | |
| 8,939,914 B2 | 1/2015 | Turnquist et al. | |
| 2009/0012417 A1 * | 1/2009 | Carr | A61B 5/015 600/549 |
| 2012/0029359 A1 | 2/2012 | Sterzer et al. | |
| 2012/0029381 A1 | 2/2012 | Carr | |
| 2013/0272339 A1 * | 10/2013 | Tofighi | G01K 11/006 374/122 |
| 2014/0180271 A1 * | 6/2014 | Johnson | A61B 18/18 606/33 |
| 2014/0343374 A1 | 11/2014 | Carr et al. | |
| 2016/0051327 A1 * | 2/2016 | Brannan | A61B 18/1815 606/33 |

FOREIGN PATENT DOCUMENTS

| | | | |
|---|---|---|---|
| JP | 61-030728 | | 2/1986 |
| JP | 01244321 A | * | 9/1989 |
| JP | 03-162637 | | 12/1991 |
| JP | 08-297055 | | 12/1996 |
| WO | WO2008092459 | | 8/2008 |

OTHER PUBLICATIONS

United States Patent and Trademark Office Acting as the International Searching Authority, "International Search Report and Written Opinion," dated May 21, 2015, in international application No. PCT/US2014/069840.

\* cited by examiner

ERROR REDUCTION IN RADIATION-BASED TEMPERATURE MEASUREMENT SYSTEMS

CROSS-REFERENCE TO RELATED APPLICATIONS

This application is a continuation of international patent application No. PCT/2014US/069840, which was filed on Dec. 11, 2014, pursuant to the Patent Cooperation Treaty (PCT) and is titled "ERROR REDUCTION IN RADIATION-BASED TEMPERATURE MEASUREMENT SYSTEMS" ("the '840 PCT Application"), pending. The '840 PCT Application claims priority to the Dec. 13, 2013, filing date of U.S. Provisional Patent Application No. 61/915,867, titled "ERROR REDUCTION IN RADIATION-BASED TEMPERATURE MEASUREMENT SYSTEMS" ("the '867 Provisional Application"). The entire disclosures of the '840 PCT Application and the '867 Provisional Application are hereby incorporated herein.

TECHNICAL FIELD

This disclosure relates generally to apparatuses and systems for determining a temperature of at least a portion of a body of a subject and, more specifically, to temperature measurement apparatuses and systems that are configured to automatically correct for unintended, external contributors, or "error-inducing modifications," to temperature signals. In particular, this disclosure relates to apparatuses and systems that are configured to eliminate error-inducing modifications to a temperature signal that occur as the temperature signal is transmitted along one or more cables between an antenna and a signal converter, such as a radiometer.

RELATED ART

Microwave temperature sensing systems typically include an antenna and a radiometer. The antenna receives microwaves of one or more (e.g., a range of, etc.) selected frequencies from a targeted source, which microwaves are indicative of temperature of the source. The antenna then generates a signal—a "temperature signal"—that corresponds to the intensity of microwaves received by the antenna and, thus, corresponds to the temperature of the source. That signal is conveyed to the radiometer, which measures or otherwise processes the signal in a manner that facilitates calculation of the temperature of the source.

Typically, a state-of-the-art radiometer is equipped with a switch that selectively conveys the temperature signal or a reference resistance, or a so-called "termination resistance" or "termination," to the remaining circuitry of the radiometer. The termination has a known, constant value, and provides an accurate reference for use in calculating a temperature from the temperature signal.

In some microwave temperature sensing systems, the antenna is located remotely from the radiometer, and communicates with the radiometer by way of a cable or another electrically conductive element. The termination is, in contrast, generated at the switch or at a location close to the switch. As a result, the termination is typically not subjected to the same factors to which the temperature signal is subjected while the temperature signal is transmitted along any cables or other electrically conductive elements.

One of the factors that may undesirably alter the temperature signal is signal attenuation, which is commonly referred to as "loss," which may occur as the temperature signal is transmitted along a conductive element, such the conductive element of a cable. Loss is particularly problematic with cables that are easy to use and unobtrusive (e.g., flexible cables, cables that lack shape memory, etc.). FIG. 1 provides a schematic representation of the losses $\text{Loss}_1$, $\text{Loss}_2$, $\text{Loss}_3$, etc., that may contribute to a temperature signal as it passes from an antenna 12, through a cable 30 to a signal converter 40, such as a radiometer. The effect of those losses $\text{Loss}_1$, $\text{Loss}_2$, $\text{Loss}_3$, etc., on the temperature calculated at the signal converter 40 ($T_{radiometer}$) and, thus, the extent to which they affect the temperature measured by the antenna 10 ($T_{antenna}$) is represented by the following equation:

$$T_{radiometer} = T_{antenna} \times (1 - (\text{Loss}_1 + \text{Loss}_2 + \text{Loss}_3 + \ldots)) + T_1 \times \text{Loss}_1 + T_2 \times \text{Loss}_2 + T_3 \times \text{Loss}_3 + \ldots \quad (1)$$

where each subscripted number represents an element x (e.g., a portion of a cable, etc., where each subscripted number in the equation above corresponds to a particular element x), each "Loss" is a fractional signal power dissipation by a particular element x and $T_1$, $T_2$, $T_3$, etc., are the temperatures associated with the loss $\text{Loss}_1$, $\text{Loss}_2$, $\text{Loss}_3$, etc., at each element x.

FIG. 2 is a graph that shows the effects of temperature on temperature signals transmitted by cables with different loss values. The system used to provide the data on which the graph of FIG. 2 is based was calibrated for a cable temperature of 25° C. As the temperature of the cable changed (x-axis), so did the temperature signal and, thus, the temperature measured by the radiometer (y-axis). The extent to which the temperature signal and the corresponding temperature measurement changed was a function of loss, with a change in the temperature of less lossy cables (e.g., those having a loss of −0.2 dB on the graph) having less of an effect on the temperature measurement than more lossy cables (e.g., those having a loss of −1.0 dB on the graph).

Consequently, loss, the effects of temperature on the cable and, potentially, other factors, all of which are referred to herein as "cable influences" and as "signal-altering events," may affect the temperature signal, which may, in turn, diminish the reliability of any temperature calculations based on that temperature signal.

SUMMARY

A temperature sensing system according to this disclosure includes an antenna, a switch, a cable and a signal converter. In such a temperature sensing system, a distance between an output of the antenna and the switch may be minimized, and a temperature signal and a reference may be subjected to the same or substantially the same cable influences or signal-altering events.

The antenna is configured to noninvasively sense at least one indicator of temperature (e.g., electromagnetic radiation, such as microwaves, etc.) emanating from a targeted source and to generate a temperature signal that corresponds to the sensed indicator(s) of temperature. The antenna may comprise a part of a transducer, which may be configured to facilitate temperature sensing with the antenna. In some embodiments, the antenna (and a transducer, if any, of which the antenna is a part) may be configured to noninvasively sense at least one indicator of temperature at a portion of a subject's body (e.g., from a location within the subject's body, etc.). The antenna generates a temperature signal, which is indicative of the temperature at the source of the at least one indicator.

The switch receives a temperature signal from the antenna, and is positioned between the antenna and the cable. The switch enables the temperature signal and the reference signal (e.g., a resistive load held at a constant temperature, etc.) from a reference circuit, or a so-called "termination," to be alternately transmitted to the signal converter. More specifically, the switch may include a first input that receives a temperature signal from the antenna and a second input that receives the reference signal from the termination. Thus, the switch may be configured in the same manner as a conventional radiometer switch, which transmits a reference signal to a radiometer or other signal converter to provide a reference for use in calculating a temperature from the temperature signal.

Although the switch is configured like a conventional radiometer switch, the switch is separate from, and remote from, the signal converter. In some embodiments, the switch may comprise a part of a transducer. In others, the switch may be configured for assembly between a transducer or an antenna and a cable. In still other embodiments, the switch may comprise part of a cable.

Because of its placement in proximity to the antenna, on the opposite side of the cable from the signal converter, or upstream of the signal converter, the switch alternately communicates its inputs—the temperature signal and the reference signal—to its output, and to a single cable or any other conductive element that communicates with its output. The switch may output these signals selectively, automatically at one or more predetermined frequencies, or in any other suitable manner.

The output of the switch communicates with the cable. The cable may comprise any conductive element suitable for transmitting the temperature signal and the reference signal. Without limiting the scope of the disclosed subject matter, the cable may comprise a coaxial cable. As will become apparent to those of ordinary skill in the art through consideration of this disclosure, a variety of different types of cables may be selected, including cables that experience relatively high amounts of loss, cables that lack significant thermal insulation and cables that are prone to other signal-altering events. Thus, a wide variety of cables may be used in temperature sensing system according to this disclosure without affecting the accuracy with which the temperature sensing system determines temperature—a feature that enables the selection of a cables on the basis of convenience (e.g., flexibility, length, etc.) rather than on low-loss characteristics.

The cable communicates the temperature signal and the reference signal to the signal converter. In various embodiments, the signal converter may comprise a radiometer. The signal converter may include one or more radiometers configured to convert temperature signal and the reference signal from one type (or format) to another and, thus, enables the temperature signal and the reference signal to be measured or otherwise processed in a manner that enables the use of these signals to calculate a temperature of the source.

In this disclosure, by positioning the switch upstream from the cable and by conveying the temperature signal and the reference signal along the same conductive element, any signal-altering events (e.g., loss, change in the temperature of the cable, etc.) that may have an effect on the temperature signal will have the same effect or substantially the same effect on the reference signal. More specifically, when the switch alternates its output between the temperature signal and the reference signal, any signal-altering events may affect the temperature signal and the reference signal in the same manner or in substantially the same manner, and/or to the same extent or to substantially the same extent. Processing of the temperature signal typically involves finding differences between the temperature signal and the reference signal. Any effect that is common to both signals, including losses along the cable, subtracts to zero or to approximately zero, eliminating or substantially eliminating the effect as a source of measurement error. The term "substantially," as used in conjunction with the manner and/or extent to which a signal-altering event affects the temperature signal and the reference signal, accounts for slight variations between conditions under which the temperature signal is transmitted and conditions under which the reference signal is transmitted; for example, when the temperature signal and the reference signal are transmitted at different times and, therefore, may be subjected to somewhat different signal-altering events. In some embodiments, switching between the temperature signal and reference signal may occur on a time scale much shorter than many signal altering events, such as warming of the cable or the like and, thus, the effects of those signal altering events on the temperature signal may differ very little, if any, from the effects of those signal altering events on the reference signal.

Some variations in the manner and/or extent to which a signal-altering event affects the temperature signal and the reference signal may be further minimized when the temperature signal and the reference signal are multiplexed. Thus, in some embodiments, the switch may comprise a signal multiplexer, which may be configured to simultaneously output temperature signals and reference signals. In embodiments where the switch comprises a multiplexer, the system (e.g., the signal converter, etc.) also includes a de-multiplexer, which separates the temperature signal and the references signal from one another so they may be properly measured or otherwise processed by the signal converter.

Since the disclosed positioning of the switch allows for the reference signal to be modified in the same or substantially the same manner or in substantially the same manner, and/or to the same or substantially the same extent as the temperature signal is modified, the switch arrangement effectively eliminates any error that would otherwise be introduced into a conventionally configured temperature sensing system due to signal-altering events, such as loss, changes in the temperature of the cable and the like. Consequently, the signal-altering event will have little or no effect on the accuracy of a temperature calculation made with both the modified temperature signal and the modified reference signal. Thus, a temperature sensing system that incorporates teachings of this disclosure may reduce or eliminate the need for correction in calculating the temperature of the source.

Another aspect of this disclosure relates to methods for reducing error in temperature calculations made with a temperature sensing system that senses electromagnetic radiation, such as one or more frequencies of microwaves. Such a method may include identifying, or targeting, a source from which a temperature measurement is to be obtained. Electromagnetic radiation representative of a temperature of the source (e.g., microwave radiation, etc.) is obtained from the source (e.g., by orienting an appropriate antenna toward the source, etc.). A temperature signal, which corresponds to the received electromagnetic radiation (e.g., an intensity of received electromagnetic radiation, etc.) may then be generated. In addition, a reference signal, which may have known, fixed characteristics, is also generated.

The temperature signal and the reference signal may be at least partially conveyed along the same, or a common, conductive element (e.g., a conductive element of a cable, etc.). In some embodiments, the common conductive element may extend across a majority, or even substantially all, of the distance the temperature signal is to be conveyed, from a location adjacent to a point where the temperature signal is generated (e.g., an output of the antenna, etc.) to a location adjacent to a signal converter. As such, the temperature signal and the reference signal may be subjected to same signal-altering events (e.g., loss, changes in cable temperature, etc.), or modifications.

A temperature signal and a reference signal that have been subjected to the same or substantially the same modifications may be received by the signal converter (e.g., a radiometer, etc.), at which they may be measured or otherwise processed in a manner that enables calculation of a temperature of the source without significant, if any, error correction.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figure 1:
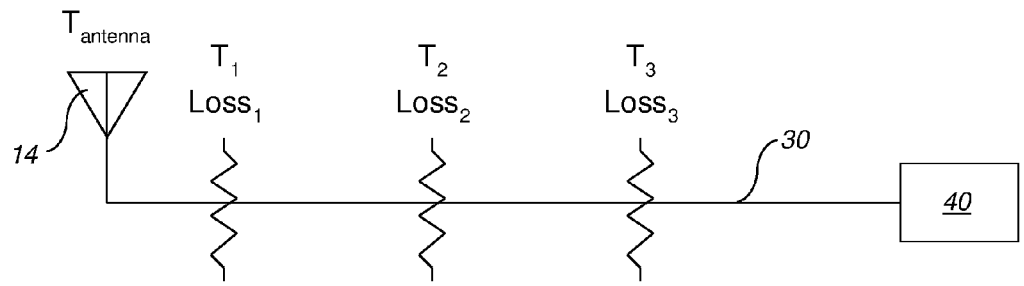
FIG. 1 is a schematic representation of signal attenuation, or loss, that may occur as a temperature signal is transmitted along the length of a cable.
Figure 2:
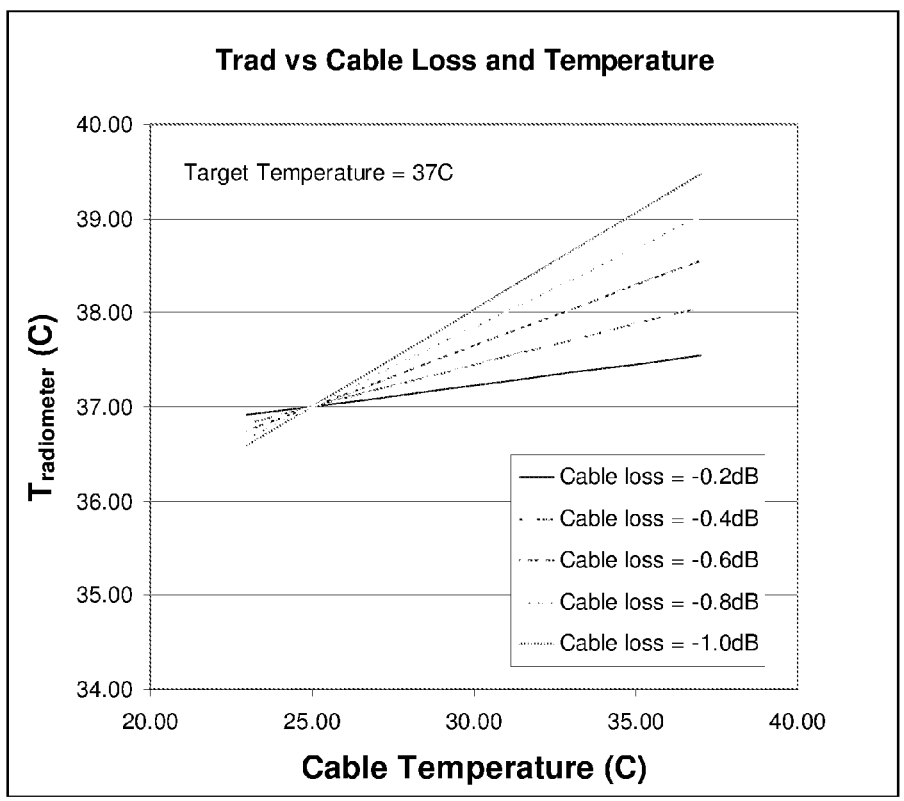
FIG. 2 is a graph illustrating the effects of temperature on the loss of cables with different loss values.
Figure 3:
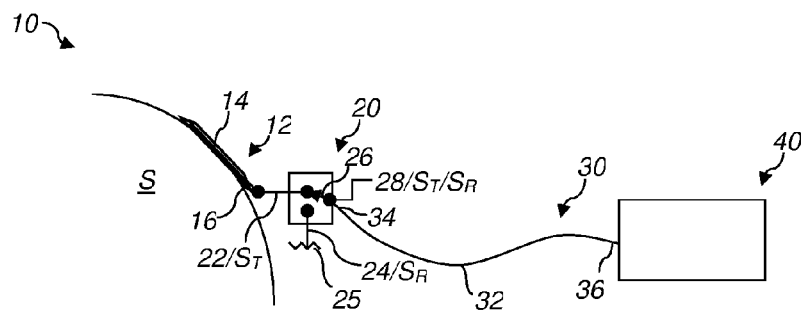
FIG. 3 schematically depicts an arrangement of components of a system for monitoring and/or measuring temperature, or temperature sensing system, by way of electromagnetic radiation, such as microwaves.

FIG. 3 depicts an embodiment of a temperature sensing system 10. The temperature sensing system 10 of FIG. 1 includes an antenna 14, a switch 20, a cable 30 and a signal converter 40.

The antenna 14 of the temperature sensing system 10 may comprise part of a transducer 12, which may be configured to orient the antenna 14 in a manner that enables the antenna 14 to receive electromagnetic radiation, such as microwaves, indicative of the temperature of a source S. In a specific, but non-limiting embodiment, the source S may comprise a particular location of a subject's body (e.g., at a location within an interior of the subject's body, etc.), and the transducer 12 may be configured to be positioned and placed against a portion of the body of a subject to enable the non-invasive monitoring and measurement of the temperature at the particular location of the subject's body. Even more specifically, the transducer 12 may be configured for placement against the subject's head in a manner that enables the non-invasive sensing and measurement of a temperature within the subject's head (e.g., the subject's brain temperature, etc.).

The antenna 14 may be configured, or tuned, to receive targeted electromagnetic radiation; i.e., a certain frequency or wavelength of electromagnetic radiation, or a certain range of frequencies or range of wavelengths of electromagnetic radiation. Upon receiving the targeted electromagnetic radiation, the antenna 14 generates and outputs a temperature signal $S_T$ that carries information about the targeted electromagnetic radiation that was received (e.g., its intensity, etc.). An output 16 of the antenna 14 communicates the temperature signal $S_T$ to the switch 20.

The switch 20 may have a configuration similar to that of a known radiometer switch. In various embodiments, the switch 20 may include a first input 22, a second input 24, a switching element 26 and an output 28.

The first input 22 communicates with the output 16 of the antenna 14. Thus, as the antenna 14 communicates temperature signals $S_T$ through its output 16, those temperature signals $S_T$ may enter the switch 20 through the first input 22.

The second input 24 of the switch 20 may be configured to receive reference signals $S_R$. More specifically, the second input 24 may communicate with a termination 25, which generates a termination resistance, which is also referred to herein as a "reference signal $S_R$," having known, and fixed, characteristics.

The switching element 26 of the switch 20 is configured to alternately convey the temperature signal $S_T$ from the first input 22 or the reference signal $S_R$ from the second input to the output 28. In some embodiments, movement of the switching element 26 between the first input 22 and the second input 24 may be automatic (e.g., occur at a constant frequency, etc.). Alternatively, the switching element 26 may be selectively positioned to communicate a temperature signal $S_T$ from the first input 22 or reference signal $S_R$ from the second input 24 to the output 28.

From the output 28, the temperature signal $S_T$ and/or the reference signal $S_R$ is communicated to an input end 34, or "transducer end," of a conductive element 32 of the cable 30. As the temperature signal $S_T$ and the reference signal $S_R$ are conveyed along the length of the conductive element 32, from its input end 34 to an opposite, output end 36, or "receiver end," any of a number of signal-altering events (e.g., loss, cable temperature, etc.) may change the temperature signal $S_T$ and the reference signal $S_R$. In embodiments where the switching element 26 of the switch 20 alternates between the temperature signal $S_T$ and the reference signal $S_R$ with high enough frequency, the signal-altering events that affect the temperature signal $S_T$ will affect the reference signal $S_R$ to the same extent or to substantially the same extent and/or in the same manner or in substantially the same manner.

The cable 30 may comprise a coaxial cable. In such an embodiment, the connectors may comprise coaxial cable connectors.

Temperature signals $S_T$ and reference signals $S_R$ are communicated from the output end 36 of the conductive element 32 of the cable 30 to the signal converter (e.g., a radiometer unit 40), where the signals are measured or otherwise processed in a manner that enables calculation of a temperature of the source S. Such a calculation may be made in a manner known in the art, but reduce the extent of corrections that are needed to provide an accurate temperature measurement. In some embodiments, any error-inducing modifications that have been made to the temperature signal $S_T$ are negated, or zeroed out, by modifications of the same extent or substantially the same extent, and/or in the same manner or substantially the same manner, to the reference signal $S_R$. Thus, the temperature calculation may be made without some or all corrections that may have otherwise been needed to correct for any signal-altering events affecting the temperature signal $S_T$ but not the reference signal $S_R$.

Figure 4:
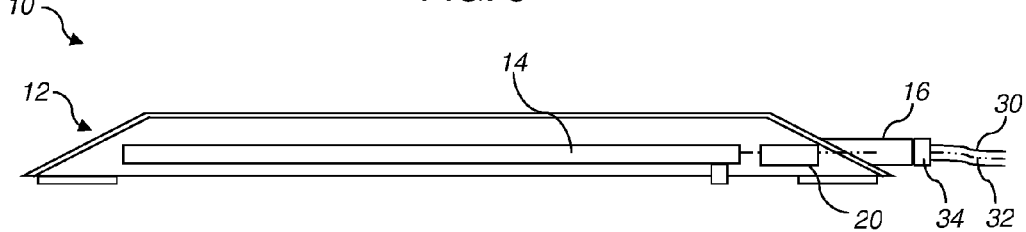
FIG. 4 illustrates an embodiment of a transducer of a temperature sensing system that includes an antenna and a switch.
Figure 5:
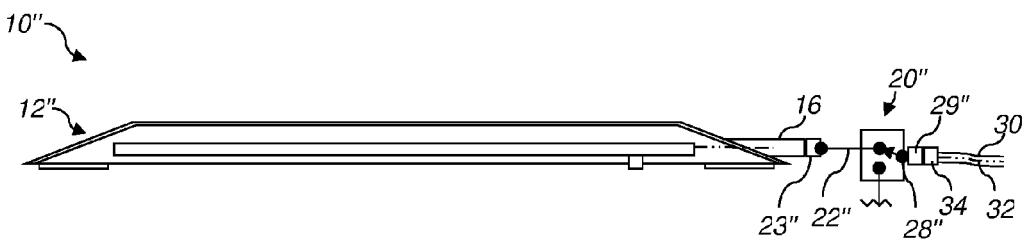
FIG. 5 illustrates an embodiment of a switch that is configured for assembly between an antenna and a cable that conveys temperature signals from the antenna to a signal converter.
Figure 6:
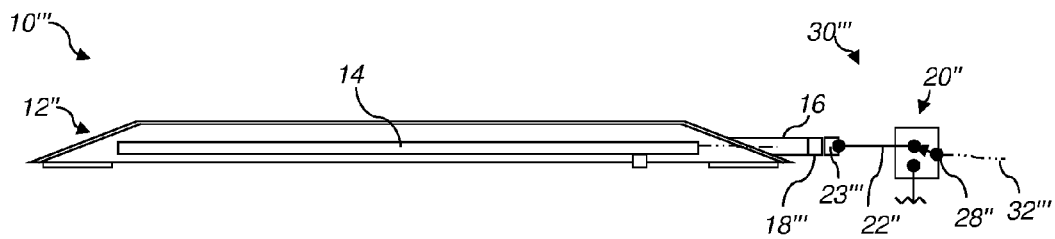
FIG. 6 illustrates an embodiment of a cable that transmits temperature signals from an antenna to a signal converter, the cable including a switch at or adjacent to an end that is configured to couple with an output of the antenna.

The arrangement depicted by FIG. 3 may be implemented in a variety of different ways. FIGS. 4 through 6 show a few embodiments of temperature sensing systems 10', 10", 10"', respectively. None of these embodiments should be considered to limit the scope of the disclosed subject matter.

In the temperature sensing system 10' of FIG. 4, the switch 20' is incorporated into a transducer 12' that also includes the antenna 14. More specifically, the switch 20' may be positioned between the output 16 of the antenna 14 and a coupling element 18' that receives an input end 34 of the conductive element 32 of the cable 30.

FIG. 5 illustrates an embodiment of temperature sensing system 10" in which the switch 20" is configured to be used with a more conventionally configured transducer 12" (e.g., a transducer that lacks a switch, etc.) and any suitable cable 30. More specifically, the first input 22" of the switch 20" may include an input coupling element 23", which may be configured to couple with a coupling element at the output 16 of the transducer 12" (e.g., a coaxial cable connector, etc.). Similarly, the output 28" of the switch 20" may include an output coupling element 29" that is configured to couple with a complementarily configured element 35 (e.g., a standard connector, such as a coaxial cable connector, etc.) at the input end 34 of the conductive element 32 of the cable 30.

In the embodiment shown by FIG. 6, the switch 20"' is part of the cable 30"'. More specifically, the switch 20"' is located at or adjacent to an input end 34"' of the cable 30"'. An input coupling element 23"' is configured to removably couple with a coupling element 18"' of a transducer 12" to establish communication between the output 16 of the antenna 14 of the transducer 12" and the first input 22"' of the switch 20"'. The output 28"' of the switch 20"' may be directly connected to the conductive element 32"' of the cable 30"'. Like the embodiment depicted by FIG. 5, such an arrangement is useful with a more conventionally configured transducer 12" (e.g., a transducer that lacks a switch, etc.).

Figure 7:
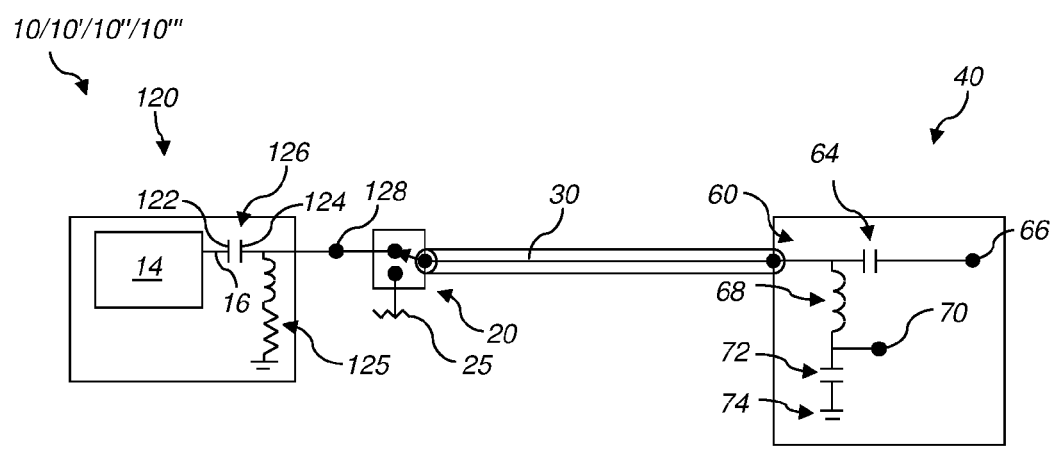
FIG. 7 schematically depicts a signal multiplexer that may be employed as a switch and a corresponding de-multiplexer of a complementary signal converter.

In any of the foregoing embodiments, the switch 20, 20', 20", 20"' may comprise a signal multiplexer in addition to a conventionally configured switch. Turning now to FIG. 7, a schematic representation of an embodiment of an electrical circuit that enables such multiplexing, or a signal multiplexer 120, upstream from a switch 20 is depicted. Specifically, FIG. 7 illustrates the output 16 of the antenna 14, a capacitor 126 including a conductor 122 in communication with the output 16, another signal source 125 (e.g., a reference temperature sensor, etc.) in communication with an opposite conductor 124 of the capacitor 126, and an output 128 in series with the other signal source 125. This arrangement may enable multiplexing of the temperature signal $S_T$ and another signal, such as a temperature signal from a reference temperature sensor or the like.

Of course, in embodiments where a temperature sensing system 10, 10', 10", 10"' includes a signal multiplexer 120, a de-multiplexer 60 is associated with the signal converter 40. Signals that are received by the signal converter 40 are conducted to a first capacitor 64 and to an inductor 68, which are in parallel with one another. Signals that cross the first capacitor 64 are conducted to one or more radiometers 66, which convert each received signal to a voltage. Signals that pass through the inductor 68 are conducted to a radiometer 70 or to a second capacitor 72, which are in parallel with one another. The second capacitor 72 is connected to a ground 74. This arrangement enables de-multiplexing of the temperature signal $S_T$ from another signal, such as a temperature signal from a reference temperature sensor or the like.

Returning reference to FIG. 3, an embodiment of a method for reducing error in temperature calculations made with a temperature sensing system 10. Such a method may include identifying, or targeting, a source S from which a temperature measurement is to be obtained. Electromagnetic radiation R (e.g., microwave radiation, etc.) emanating from the source S and representative of a temperature of the source S is detected, such as by orienting an appropriately configured and/or tuned antenna 14 toward the source S. A temperature signal $T_S$, which corresponds to the received electromagnetic radiation R (e.g., an intensity of received electromagnetic radiation, etc.) may then be generated by the antenna 14. In addition, a reference signal $S_R$, which may have known, fixed characteristics, is also generated by the termination 25.

The temperature signal $S_T$ and the reference signal $S_R$ may be at least partially conveyed along the same, or a common, cable 30 or other suitable conductive element. In some embodiments, the cable 30 may extend across a majority, or even substantially all, of the distance the temperature signal $S_T$ is to be conveyed, from a location adjacent to the output 16 of the antenna 14, where the temperature signal is generated, to a signal converter 40. As such, the temperature signal $S_T$ and the reference signal $S_R$ may be subjected to same signal-altering events (e.g., loss, changes in cable temperature, etc.), corruption or other detrimental effects.

A temperature signal $S_T$ and a reference signal $S_R$ that have been subjected to the same or substantially the same modifications may be received by the signal converter 40, at which they may be measured or otherwise processed in a manner that enables calculation of a temperature of the source S without significant, if any, error correction.

Although the foregoing description sets forth many specifics, these should not be construed as limiting the scope of any of the claims, but merely as providing illustrations of some embodiments and variations of elements or features of the disclosed subject matter. Other embodiments of the disclosed subject matter may be devised which do not depart from the spirit or scope of any of the claims. Features from different embodiments may be employed in combination. Accordingly, the scope of each claim is limited only by its plain language and the legal equivalents thereto.

What is claimed:

1. An apparatus for establishing communication between a transducer for noninvasively measuring temperature within a body of a subject and a signal converter, comprising:

a coaxial cable for communicating signals received by an antenna of a transducer from the transducer to a signal converter that includes a radiometer, the coaxial cable having a transducer end and an opposite, receiver end; and a switch for the signal converter directly coupled to the transducer end of the cable, the switch being separate from the radiometer by the coaxial cable, the coaxial cable being located between the switch and the radiometer, such that the switch is remotely located relative to the radiometer.

2. The apparatus of claim 1, wherein the switch includes an input connector configured to be removably coupled with an output connector of the transducer.

3. The apparatus of claim 2, wherein the switch includes an output connector configured to be removably coupled with a connector at the transducer end of the cable.

4. The apparatus of claim 2, wherein the switch comprises a part of the cable, and the input connector of the switch comprises a transducer connector at the transducer end of the cable.

5. The apparatus of claim 1, wherein the switch comprises a part of the transducer.

6. The apparatus of claim 5, wherein the switch is located between an output of the antenna of the transducer and an output connector of the transducer, which output connector is configured to enable the cable to be removably coupled to the transducer.

7. The apparatus of claim 6, wherein the output connector of the switch comprises an output connector of the transducer.

8. The apparatus of claim 1, wherein the coaxial cable includes:
   a conductive element for communicating a multiplexed signal including an temperature signal from an antenna of the transducer and a reference signal from a reference thermistor associated with the transducer.

9. A switch for a signal converter of a temperature sensing system, the switch comprising:
   a first input port comprising a temperature signal;
   a second input port comprising a reference signal; and
   an output coupled to:
      a coaxial cable for communicating signals from the transducer to a signal converter of the temperature sensing system; or
      a connector configured to be removably coupled to a transducer end of a cable for communicating signals from the transducer to a signal converter of the temperature sensing system,
   wherein the switch for the signal converter is directly coupled to the transducer end of the cable, the switch being separate from the radiometer by the coaxial cable, the coaxial cable being located between the switch and the radiometer, such that the switch is remotely located relative to the radiometer.

10. The switch of claim 9, wherein the connector of the output enables:
   the temperature signal and the reference signal to be alternately communicated through the output in a manner that subjects the temperature signal and the reference signal to the same signal-altering event; and
   reduces a temperature calculation error caused as the signal-altering event modifies the temperature signal.

11. A temperature sensing system, comprising:
   a transducer including an antenna configured to receive temperature signals from within a body of a subject;
   a signal converter including a radiometer configured to receive signals from the antenna;
   a coaxial cable configured to establish communication between the transducer and the signal converter; and
   a switch is carried by the transducer or the coaxial cable and located between the transducer and the coaxial cable, the switch controls communication of signals to the signal converter.

12. The temperature sensing system of claim 11, wherein the switch is electrically located between the transducer and the cable.

13. The temperature sensing system of claim 12, wherein the switch is located at a transducer coupling end of the cable.

* * * * *